United States Patent
Beuerle et al.

(10) Patent No.: US 12,447,663 B2
(45) Date of Patent: Oct. 21, 2025

(54) POLYMERIC PREFORM AND CONTAINER INCLUDING ACTIVE OXYGEN SCAVENGER LAYER AND RECYCLED MATERIAL

(71) Applicant: AMCOR RIGID PACKAGING USA, LLC, Ann Arbor, MI (US)

(72) Inventors: Frederick C. Beuerle, Jackson, MI (US); William J. Dubuque, Dexter, MI (US)

(73) Assignee: AMCOR RIGID PACKAGING USA, LLC, Ann Arbor, MI (US)

( * ) Notice: Subject to any disclaimer, the term of this patent is extended or adjusted under 35 U.S.C. 154(b) by 85 days.

(21) Appl. No.: 18/277,338

(22) PCT Filed: Feb. 16, 2021

(86) PCT No.: PCT/US2021/018145
§ 371 (c)(1),
(2) Date: Aug. 15, 2023

(87) PCT Pub. No.: WO2022/177546
PCT Pub. Date: Aug. 25, 2022

(65) Prior Publication Data
US 2024/0131773 A1  Apr. 25, 2024
US 2024/0227276 A9  Jul. 11, 2024

(51) Int. Cl.
*B29C 49/22* (2006.01)
*B29C 49/06* (2006.01)
(Continued)

(52) U.S. Cl.
CPC .............. *B29C 49/22* (2013.01); *B29C 49/06* (2013.01); *B65D 1/0215* (2013.01);
(Continued)

(58) Field of Classification Search
CPC ......... B32B 3/04; B32B 27/302; B32B 27/32; B32B 27/36; B32B 27/18; B32B 27/08;
(Continued)

(56) References Cited

U.S. PATENT DOCUMENTS 6,365,247 B1 * 4/2002 Cahill ................. B65D 1/0215
428/35.7
2002/0155236 A1  10/2002 Cahill et al.
(Continued)

FOREIGN PATENT DOCUMENTS

EP          4054816 A1    9/2022
WO    WO-2009079724 A2    7/2009

OTHER PUBLICATIONS

International Search Report and Written Opinion of the ISA issued in PCT/US2021/018145, mailed Nov. 12, 2021; ISA/KR.
(Continued)

*Primary Examiner* — Monica A Huson
(74) *Attorney, Agent, or Firm* — Harness, Dickey & Pierce, P.L.C.

(57) ABSTRACT

A preform configured to be blow-molded into a container. The preform includes a first layer and a second layer. The first layer is an active oxygen scavenger layer including an oxygen scavenger, a catalyst, and a first material having up to 25% recycled polymer. The second layer includes a second material having at least 25% recycled polymer.

18 Claims, 6 Drawing Sheets

Figure 1:
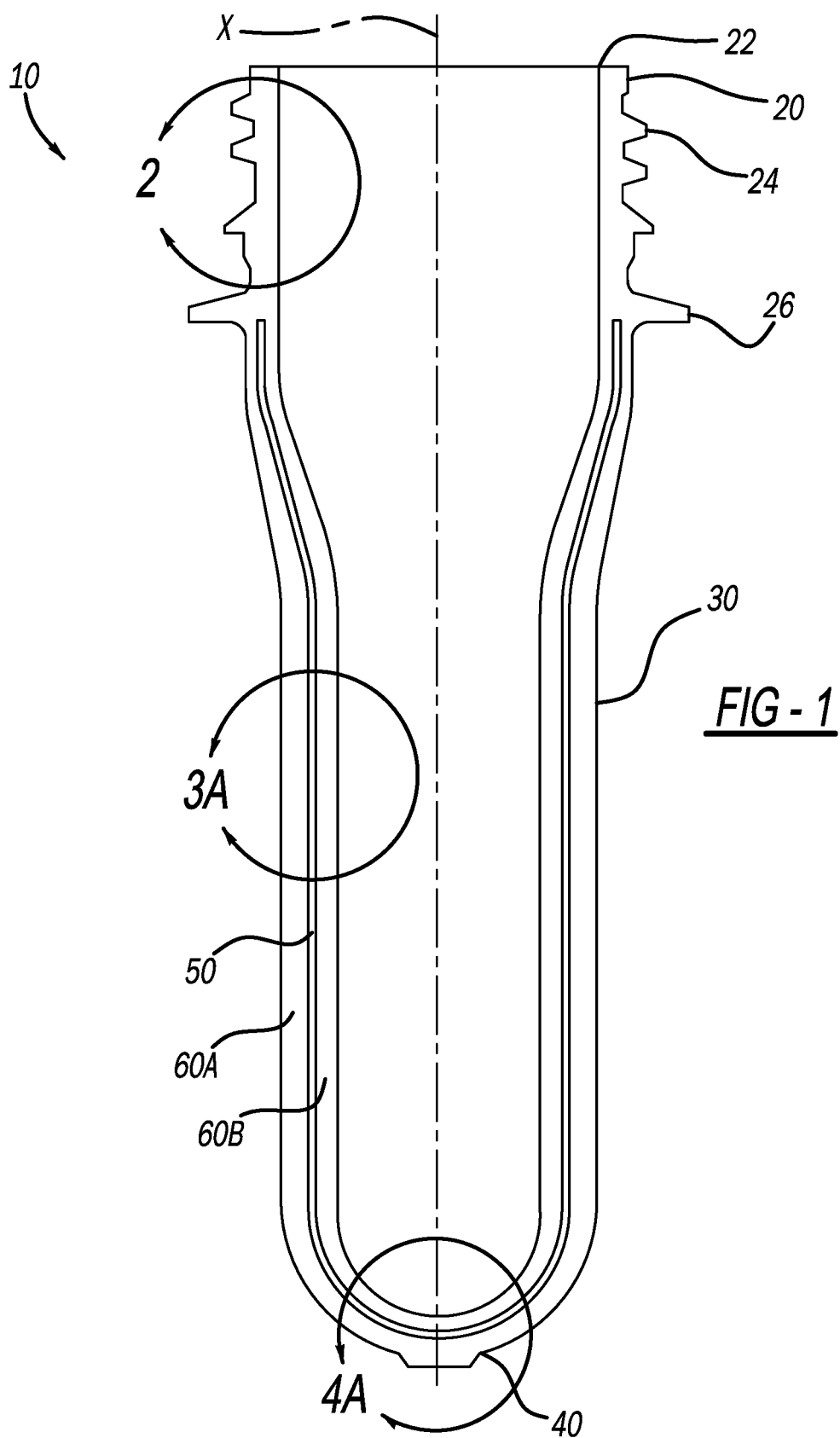

(51) Int. Cl.
 *B65D 1/02* (2006.01)
 *B65D 81/26* (2006.01)
 *B29K 105/00* (2006.01)
 *B29K 105/26* (2006.01)
 *B29L 31/00* (2006.01)

(52) U.S. Cl.
 CPC .... *B65D 81/266* (2013.01); *B29C 2949/0715* (2022.05); *B29K 2105/0014* (2013.01); *B29K 2105/26* (2013.01); *B29L 2031/7158* (2013.01)

(58) Field of Classification Search
 CPC ............ B32B 2272/00; B32B 2250/40; B32B 2307/732; B32B 2439/70; B32B 2250/24; C08L 67/02; B29C 49/22; B29C 49/06; B29C 49/0005; B29C 2949/0715; B29C 2949/3034; B29C 2949/0861; B29C 2049/023; B29C 2949/0781; B65D 1/0215; B65D 81/266; C08K 5/098; B29L 2031/7158; B29K 2995/0069; B29K 2995/0067; B29K 2023/12; B29K 2023/065; B29K 2105/0014; B29K 2023/0633; B29K 2067/003; B29K 2105/26; B29K 2025/06; C08G 63/183
 See application file for complete search history.

(56) References Cited

U.S. PATENT DOCUMENTS

| | | | |
|---|---|---|---|
| 2003/0031814 A1* | 2/2003 | Hutchinson | B29C 49/071 264/513 |
| 2004/0256763 A1 | 12/2004 | Collette et al. | |
| 2019/0382152 A1 | 12/2019 | Dubuque | |
| 2020/0399473 A1 | 12/2020 | Ferrari et al. | |

OTHER PUBLICATIONS

European Office Action from counterpart EP219269743, dated Aug. 25, 2025.

\* cited by examiner

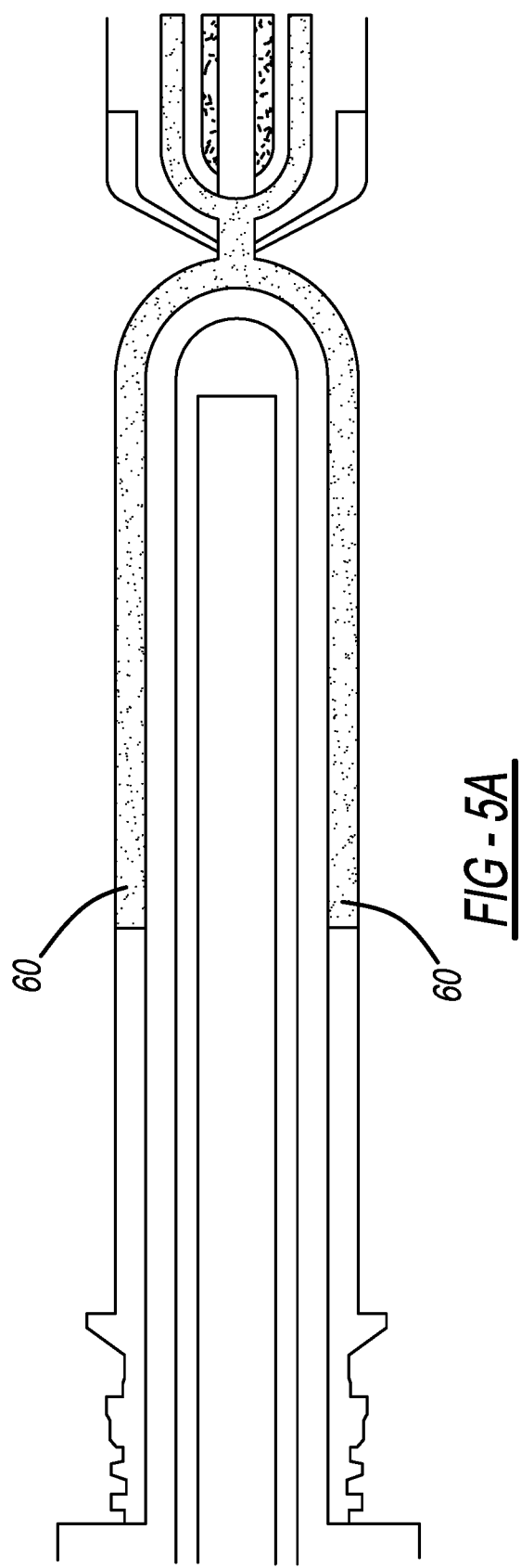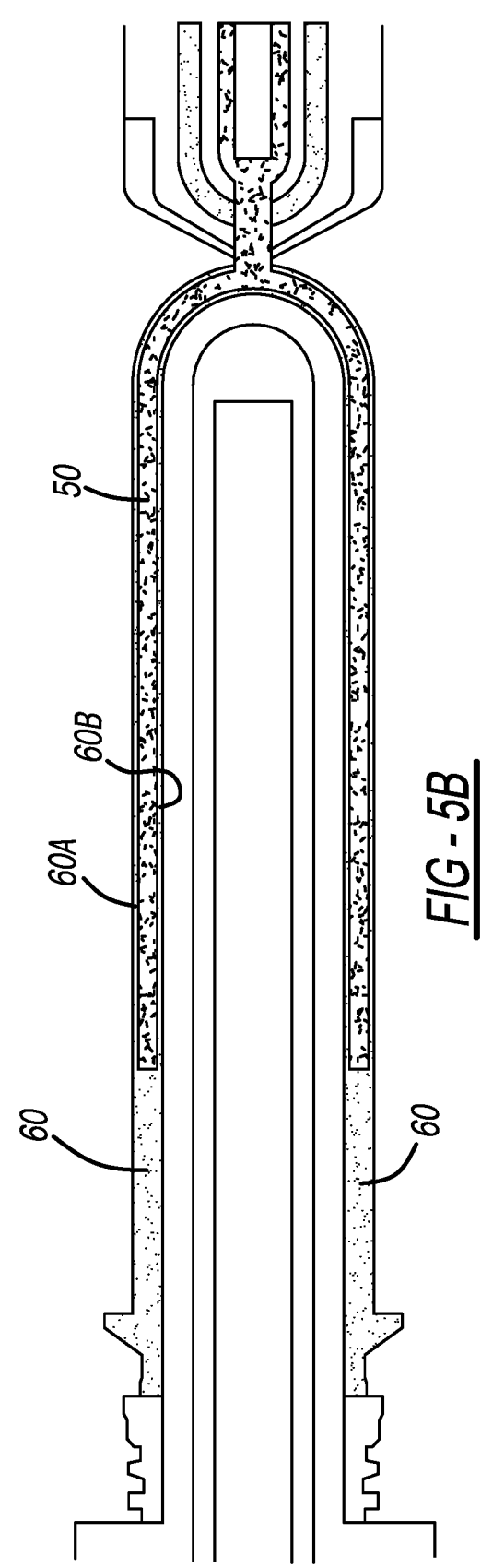

POLYMERIC PREFORM AND CONTAINER INCLUDING ACTIVE OXYGEN SCAVENGER LAYER AND RECYCLED MATERIAL

CROSS-REFERENCE TO RELATED APPLICATIONS

This application is a U.S. National Phase Patent Application under 35 U.S.C. 371 of International Application No. PCT/US2021/018145, filed on Feb. 16, 2021, the entire disclosure of which is incorporated herein by reference.

FIELD

The present disclosure relates to a polymeric preform and container including an active oxygen scavenger layer and recycled material.

BACKGROUND

This section provides background information related to the present disclosure, which is not necessarily prior art.

Forming polymeric containers from recycled material advantageously conserves resources and reduces environmental footprint. For example, using recycled material reduces the amount of virgin petroleum based resin required, which reduces greenhouse gas generation. It is thus desirable to make polymeric containers from as much recycled content as possible Barrier materials are used in polymeric containers to extend the shelf-life of the product stored therein. Such barrier materials may be passive or active. Passive barriers are blended with polyethylene terephthalate (PET) or used as a distinct scavenger layer in a multilayer structure to reduce the gas permeation of oxygen. Recycled polymers, such as recycled PET (rPET), generally have little to no impact on passive barriers. Passive barriers may thus typically be mixed with rPET. In contrast to passive barriers, the effectiveness of active barriers, such as oxygen scavengers, is negatively impacted if mixed with rPET. As a result, current polymeric containers with an active oxygen scavenger layer have little to no recycled polymeric material.

A polymeric container including an active oxygen scavenger layer and relatively high recycled content would therefore be desirable. The present disclosure advantageously provides for an improved polymeric container with an active oxygen scavenger layer and recycled polymeric material. The present disclosure provides numerous additional advantages as explained in detail herein and as one skilled in the art will appreciate.

SUMMARY

This section provides a general summary of the disclosure, and is not a comprehensive disclosure of its full scope or all of its features.

The present disclosure includes a preform configured to be blow-molded into a container. The preform includes a first layer and a second layer. The first layer is an active oxygen scavenger layer including an oxygen scavenger, a catalyst, and a first material having up to 25% recycled polymer. The second layer includes a second material having at least 25% recycled polymer.

The present disclosure further includes a container made of a polymeric material. The container has a finish defining an opening, a sidewall of a body, and a base. A first layer of the sidewall and the base is an active oxygen scavenger layer including an oxygen scavenger, a catalyst, and a first material having up to 25% recycled polymer. A second layer of the sidewall and the base includes a second material having at least 25% recycled polymer.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of select embodiments and not all possible implementations, and are not intended to limit the scope of the present disclosure.

Figure 2:
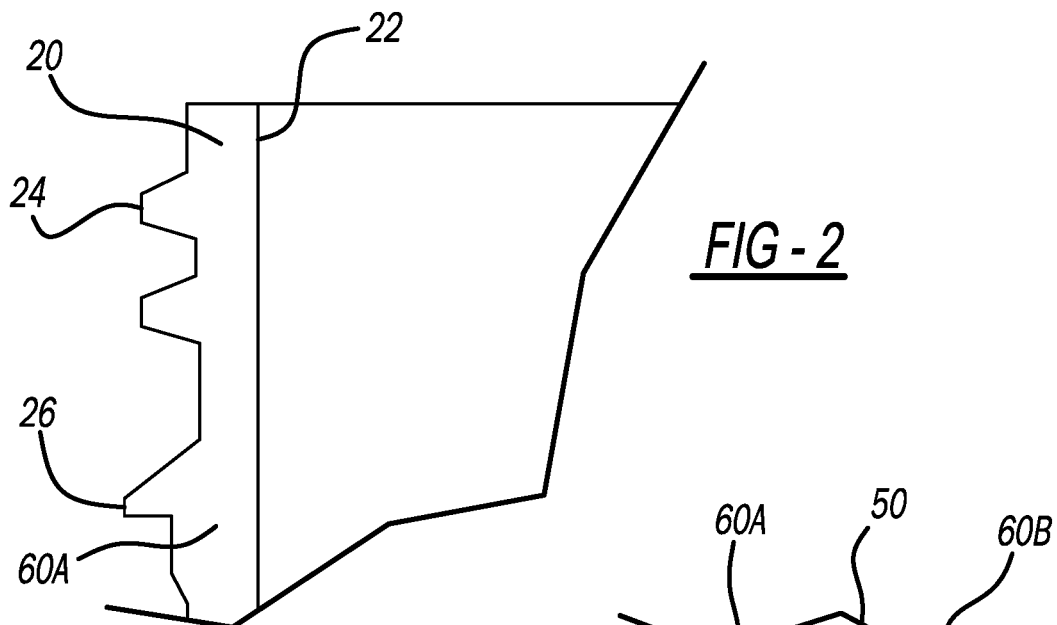
Figure 3A:
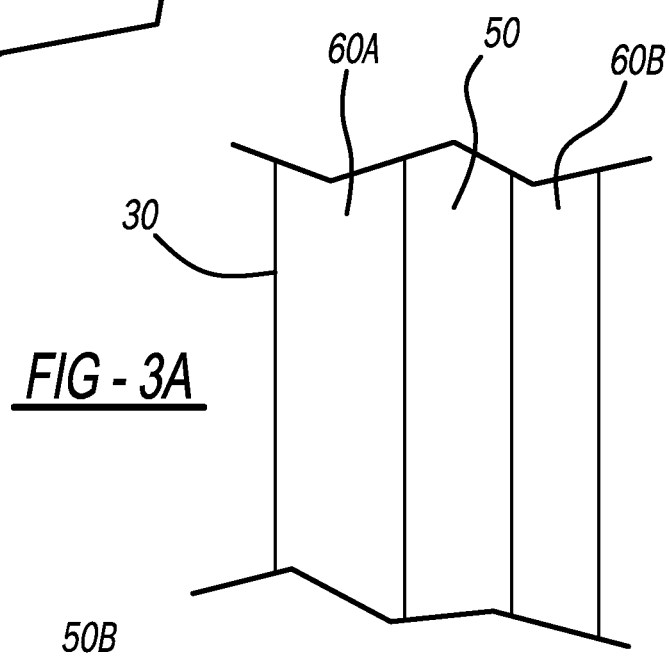
Figure 3B:
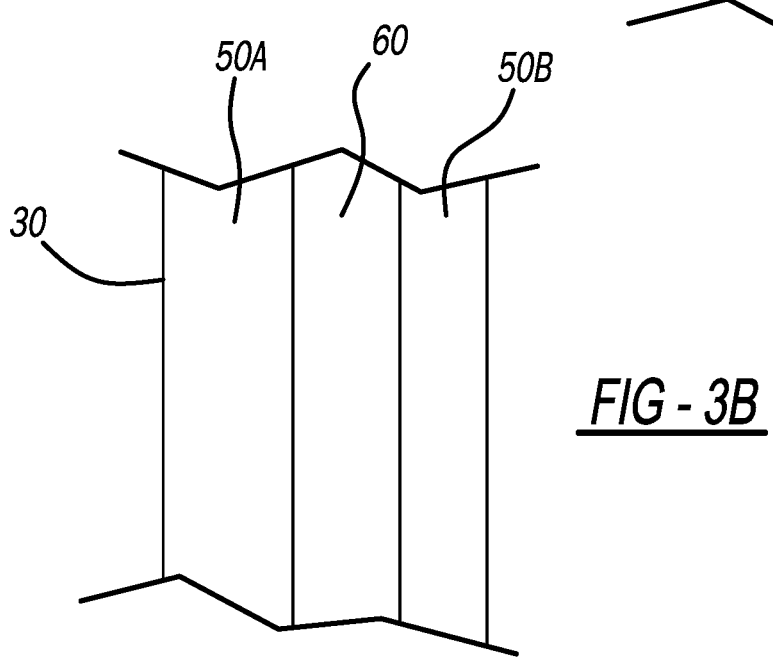
Figure 4A:
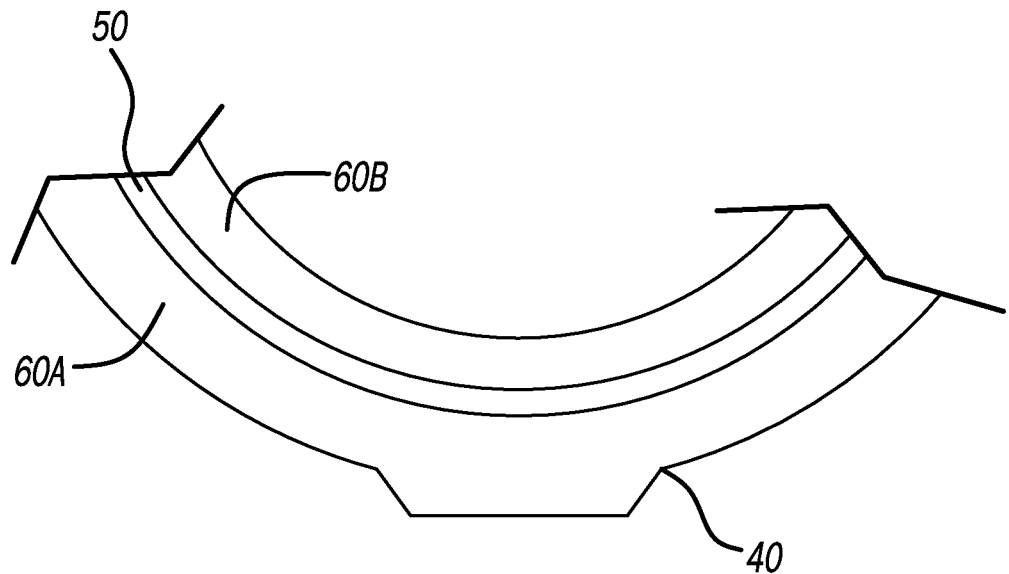
Figure 4B:
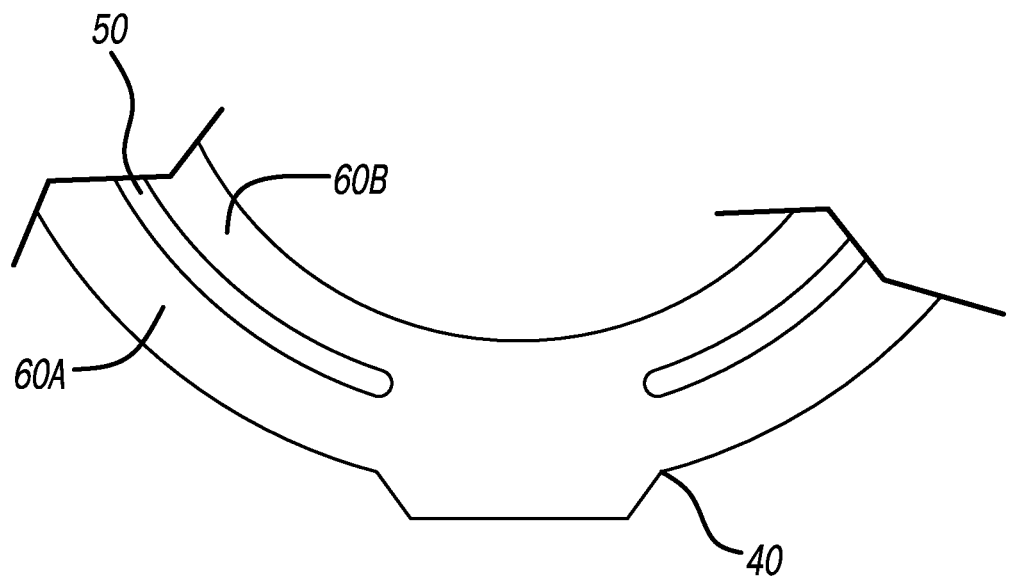
Figure 5C:
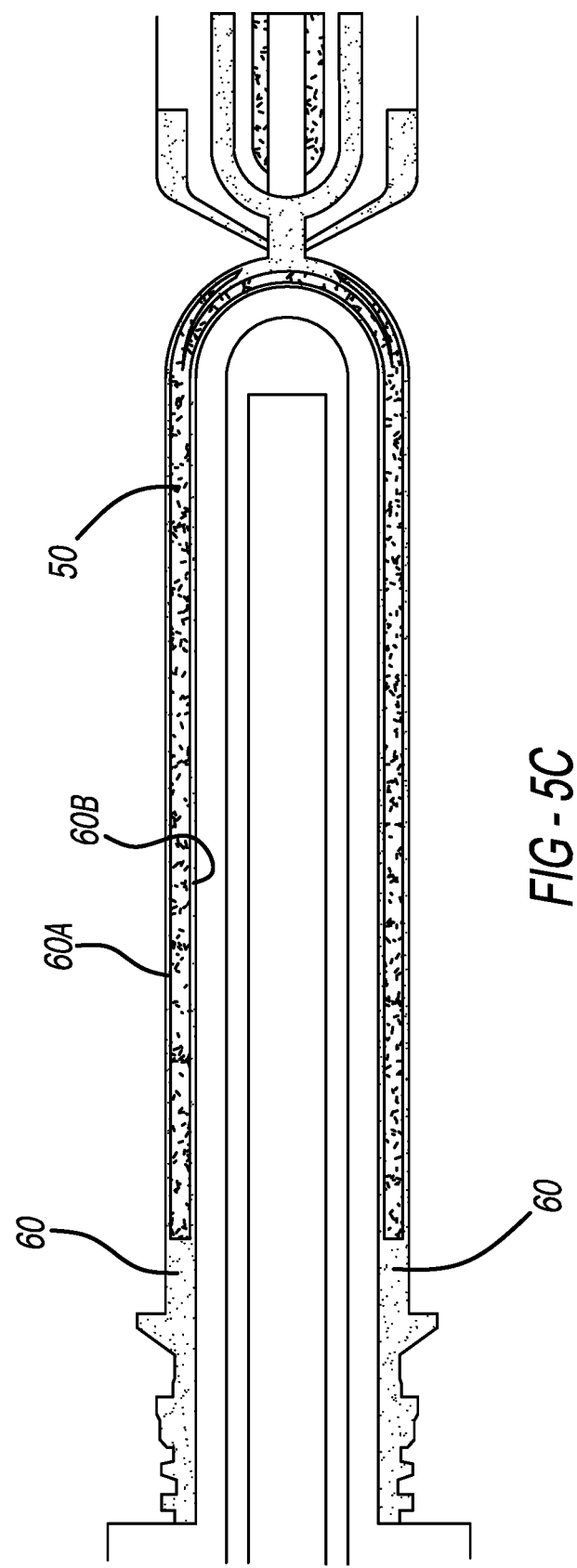
Figure 6:
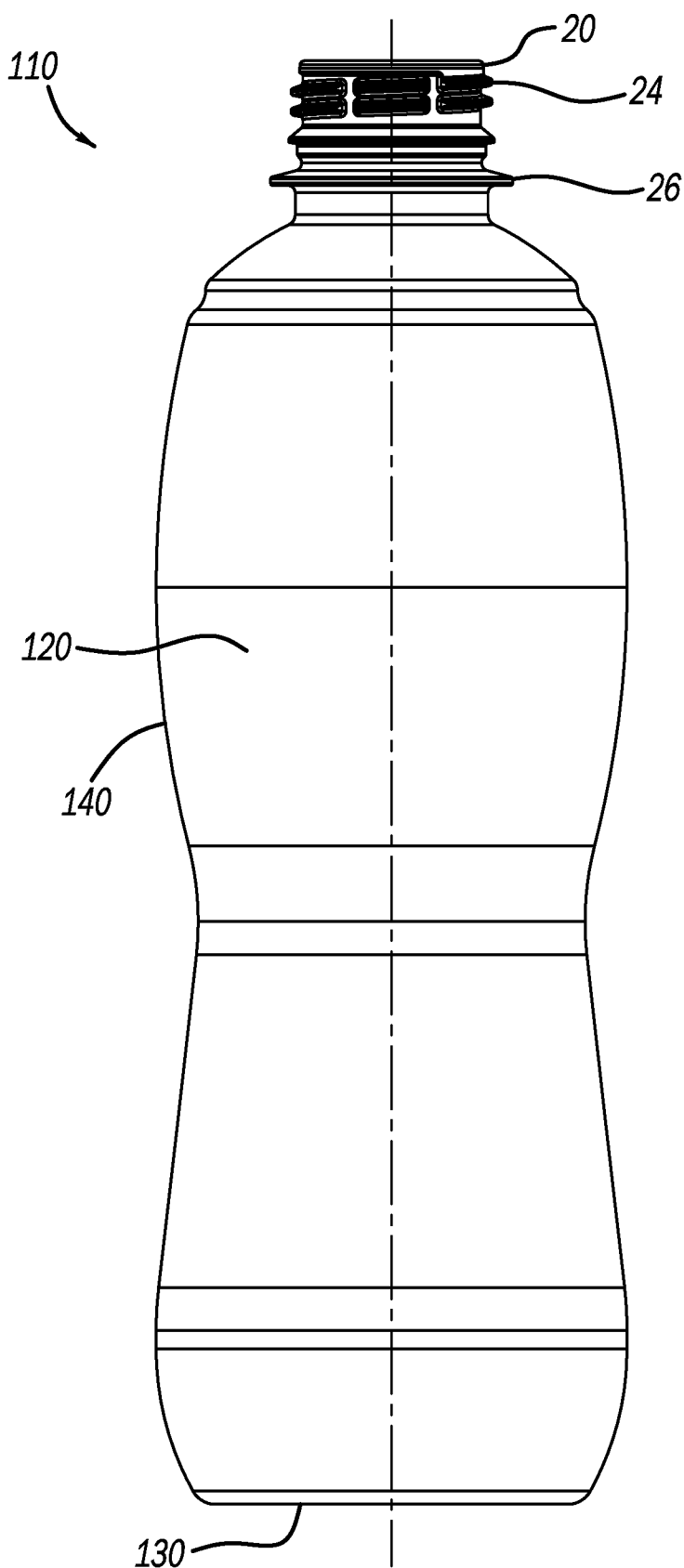

FIG. 1 is a cross-sectional view of a container preform in accordance with the present disclosure;
FIG. 2 illustrates area 2 of FIG. 1;
FIG. 3A illustrates area 3A of FIG. 1;
FIG. 3B illustrates an alternate configuration of area 3A;
FIG. 4A illustrates area 4A of FIG. 1;
FIG. 4B illustrates an alternate configuration of area 4A;
FIGS. 5A, 5B, and 5C illustrate an injection process for forming the preform; and
FIG. 6 is a side view of an exemplary container formed from the preform of FIG. 1.

Corresponding reference numerals indicate corresponding parts throughout the several views of the drawings.

DETAILED DESCRIPTION

Example embodiments will now be described more fully with reference to the accompanying drawings.

FIG. 1 illustrates an exemplary preform 10 in accordance with the present disclosure. The preform 10 is configured to be injection blow-molded into a mold to form a container. An exemplary container that may be formed from the preform 10 is illustrated in FIG. 6 at reference numeral 110. The container 110 may be of any suitable shape and size, and configured to store any suitable commodity, such as, but not limited to, the following: water; soft drinks; energy drinks; alcoholic beverages; juice; foodstuffs, etc. The preform 10 and the resulting container 110 may be made of any suitable material, such as, but not limited to, the following: polyethylene terephthalate (PET), low-density polyethylene (LDPE), high-density polyethylene (HDPE), polypropylene (PP), polystyrene, and the like, for example.

The preform 10 generally includes a finish 20, which defines an opening 22, which is an opening to both the preform 10 and the resulting container 110. Extending from an outer surface of the finish 20 are threads 24. The threads 24 are configured to cooperate with threads of any suitable closure for securing the closure to the finish 20 and closing the opening 22. Beneath the threads 24 is a flange 26. The flange 26 supports the preform 10 in a mold during blow-molding of the container 110 from the preform 10.

Extending from the finish 20 is a sidewall 30 of the preform 10. The sidewall 30 defines a body 120 of the container 110. The sidewall 30 is generally cylindrical, as is the finish 20. The preform 10 thus has an overall round or cylindrical shape. The sidewall 30 extends to a tip or dome 40 of the preform 10. The tip 40 is blown into a base 130 of the container 110. A longitudinal axis X of the preform 10 extends through a center of the tip or dome 40.

The preform 10 further includes a first layer, which is an active oxygen scavenger layer 50. The active oxygen scavenger layer 50 extends within the sidewall 30 and the tip/dome 40. The active oxygen scavenger layer 50 need not be present in the finish 20. For example, the active oxygen scavenger layer 50 may extend from about the flange 26 to, and across, all or a portion of the tip/dome 40. The active oxygen scavenger layer 50 is an active oxygen scavenger, which prevents, or severely restricts, oxygen from passing through the sidewall 30, which forms sidewall 140 of the container 110 (see FIG. 6). The active oxygen scavenger layer 50 thus advantageously extends the shelf life of the commodity stored within the container 110.

The active oxygen scavenger layer 50 may include any suitable oxygen oxidizable polymer that is an scavenger. Suitable active oxygen scavengers include, but are not limited to, Amosorb® (offered by Avient of Avon Lake, Ohio) and Oxyclear® (offered by Invista of Wichita, Kansas). Any suitable Oxyclear® oxygen scavenger may be used, such as Oxyclear® 3500C. The active oxygen scavenger layer 50 further includes a non-recycled polymer, such as PET, LDPE, HDPE, or PP, for example. The active oxygen scavenger layer 50 is devoid of recycled polymeric material in some applications. In other applications, the active oxygen scavenger layer 50 may include a single pellet rPET (recycled PET) resin. A single pellet rPET resin is a resin with up to 25% rPET polymerized with virgin PET (the glycolysis process removes contaminants and tighter specifications eliminate unknown variability).

The active oxygen scavenger layer 50 may also include any suitable catalyst, such as cobalt transition salts, including cobalt stearate and cobalt decanoate. Suitable catalysts include, but are not limited to, Oxyclear® 2710 Cobalt Catalyst Masterbatch. In some applications, Oxyclear® 3500C may be combined at the active oxygen scavenger layer 50 with a catalyst containing resin Indorama™ 2510/2512, which is offered by Indorama Ventures of Bangkok, Thailand.

The active oxygen scavenger layer 50 may be arranged between an outer recycled portion or layer 60A and an inner recycled portion or layer 60B. The outer recycled layer 60A and the inner recycled layer 60B are a first portion and a second portion respectively of a second layer of the preform 10. In other applications, the active oxygen scavenger layer 50 may include a first portion 50A and a second portion 50B, with a single recycled layer 60 therebetween (see FIG. 3B). The outer and inner recycled layers 60A, 60B each include at least 25% (such as 0% to 25%) recycled polymeric material, such as PET, LDPE, HDPE, or PP. Each one of the outer and inner recycled layers 60A, 60B may include non-recycled (i.e., virgin) polymeric material as well. One or more of the active oxygen scavenger layer 50, the outer recycled layer 60A, and the inner recycled layer 60B may include any suitable additives to provide a desired color of the sidewall 140 of the container 110, UV protection, etc.

With reference to FIGS. 5A, 5B, and 5C, an exemplary injection molding process for forming the preform 10 is illustrated. In the example illustrated, the second layer 60 is first injected into a mold (FIG. 5A). Then, the first layer 50 is injected into the second layer 60, thereby forming the first portion 60A (outer recycled layer) and the second portion 60B (inner recycled layer) with the first layer 50 (active oxygen scavenger layer) therebetween (see FIGS. 5B and 5C). The first and second layers 50, 60 are co-injected using any suitable multi-layer injection molding process. The active oxygen scavenger layer 50 is from a first resin source melt stream, and the first and second portions 60A, 60B are from a second resin source melt stream. Thus, only two melt streams are needed to form 3-layers.

FIG. 2 illustrates in greater detail area 2 of the preform 10, which includes the finish 20. At area 2, the finish 20 does not include the active oxygen scavenger layer 50. In some applications, the finish 20 includes or consists of the outer recycled layer 60A, and is devoid of both the active oxygen scavenger layer 50 and the inner recycled layer 60B. The finish 20 may be made entirely of recycled polymeric material, or may be a mixture of recycled and non-recycled polymeric material, such as PET, LDPE, HDPE, or PP.

FIG. 3A illustrates area 3A of the preform 10, which includes the sidewall 30. The sidewall 30 includes the active oxygen scavenger layer 50 between the outer recycled layer 60A and the inner recycled layer 60B. FIG. 4A illustrates area C of the preform 10, which includes the active oxygen scavenger layer 50 extending across the tip/dome 40. FIG. 3B illustrates the alternate configuration with the second layer 60 between first portion 50A and second portion 50B of the first layer 50. FIG. 4B illustrates an alternate configuration where the layer 50 does not extend entirely across the tip/dome 40.

The active oxygen scavenger layer 50 and the outer and inner recycled layers 60A, 60B may comprise any suitable weight percentage of the overall preform 10. For example and with respect to the configuration of FIG. 3A where the active oxygen scavenger layer 50 is between the outer recycled layer 60A and the inner recycled layer 60B, exemplary weight percentages for four different preforms 10 are set forth below in Table A1, exemplary preform % of layer thicknesses are set forth in Table A2, exemplary recycled material content is set forth in Table A3, and exemplary OxyClear content is set forth in Table A4. Preforms 1, 2, 3, and 4 listed in the tables below have the tip/dome 40 configuration of FIG. 4A. Preforms 5 and 6 have the tip/dome 40 configuration of FIG. 4B.

TABLE A1

Preform Weight %

| | Outer & Inner Recycled Layers 60A, 60B | Active Oxygen Scavenger Layer 50 |
|---|---|---|
| Preform #1 | 50% | 50% |
| Preform #2 | 80% | 20% |
| Preform #3 | 95% | 5% |
| Preform #4 | 97% | 3% |
| Preform #5 | 80% | 20% |
| Preform #6 | 95% | 5% |

TABLE A2

Preform % of layer thickness

| Preform Location | | Outer Recycled Layer (60A) | Active Oxygen Scavenger Layer (50) | Inner Recycled Layer (60B) |
|---|---|---|---|---|
| Preform #1 | Sidewall | 20% | 70% | 10% |
| | Dome | 70% | 20% | 10% |
| Preform #2 | Sidewall | 50% | 30% | 20% |
| | Dome | 80% | 10% | 10% |
| Preform #3 | Sidewall | 60% | 10% | 30% |
| | Dome | 75% | 5% | 20% |
| Preform #4 | Sidewall | 61% | 8% | 31% |
| | Dome | 75% | 4% | 21% |
| Preform #5 | Sidewall | 47% | 35% | 18% |
| | Dome | 100% | — | — |
| Preform #6 | Sidewall | 59% | 12% | 29% |
| | Dome | 100% | — | — |

TABLE A3

Recycled Material Content (wt %)

| | Recycled Layers (Outer 60A + Inner 60B) | Overall Preform |
|---|---|---|
| Preform #1 | 100% | 50% |
| Preform #2 | 100% | 80% |
| Preform #3 | 100% | 95% |
| Preform #4 | 100% | 97% |
| Preform #5 | 100% | 80% |
| Preform #6 | 100% | 95% |

TABLE A4

OxyClear Content (wt. %)

| | Active Oxygen Scavenger Layer (50) | | | Overall Preform | | |
|---|---|---|---|---|---|---|
| | Low | Mid | High | Low | Mid | High |
| Preform #1 | 1.0% | 2.5% | 6.0% | 0.5% | 1.3% | 3.0% |
| Preform #2 | 2.5% | 6.3% | 15.0% | 0.5% | 1.3% | 3.0% |
| Preform #3 | 10.0% | 25.0% | 60.0% | 0.5% | 1.3% | 3.0% |
| Preform #4 | 16.7% | 41.7% | 100.0% | 0.5% | 1.3% | 3.0% |
| Preform #5 | 2.5% | 6.3% | 15.0% | 0.5% | 1.3% | 3.0% |
| Preform #6 | 10.0% | 25.0% | 60.0% | 0.5% | 1.3% | 3.0% |

For example and with respect to the configuration of FIG. 3B where the second layer 60 is between first portion 50A and second portion 50B of the first layer 50 including an active oxygen scavenger, exemplary weight percentages of four different preforms 10 are set forth below in Table B1, exemplary preform % of layer thicknesses are set forth in Table B2, exemplary recycled material content is set forth in Table B3, and exemplary OxyClear content is set forth in Table B4. For preforms 7 and 8, the middle layer 60 extends entirely across the tip/dome 40 (similar to the configuration of FIG. 4A with respect to layer 50). For preforms 9 and 10, the middle layer 60 does not extend entirely across the tip/dome 40 (similar to the configuration of FIG. 4B with respect to layer 50).

TABLE B1

Preform Weight %

| | Outer & Inner Layers (50A, 50B) with Active O₂ Scavenger | Middle Layer (60) |
|---|---|---|
| Preform #7 | 50% | 50% |
| Preform #8 | 80% | 20% |
| Preform #9 | 50% | 50% |
| Preform #10 | 80% | 20% |

TABLE B2

Preform % of layer thickness

| | Preform Location | Outer Layer with Active O₂ Scavenger (50A) | Middle Layer (60) | Inner Layer with Active O₂ Scavenger (50B) |
|---|---|---|---|---|
| Preform #7 | Sidewall | 20% | 70% | 10% |
| | Dome | 70% | 20% | 10% |
| Preform #8 | Sidewall | 50% | 30% | 20% |
| | Dome | 80% | 10% | 10% |
| Preform #9 | Sidewall | 14% | 78% | 8% |
| | Dome | 100% | — | — |

TABLE B2-continued

Preform % of layer thickness

| | Preform Location | Outer Layer with Active O₂ Scavenger (50A) | Middle Layer (60) | Inner Layer with Active O₂ Scavenger (50B) |
|---|---|---|---|---|
| Preform #10 | Sidewall | 48% | 34% | 18% |
| | Dome | 100% | — | — |

TABLE B3

Recycled Material Content (wt %)

| | Outer & Inner Layers (50A, 50B) with Active O₂ Scavenger | Overall Preform |
|---|---|---|
| Preform #7 | 100% | 50% |
| Preform #8 | 100% | 20% |
| Preform #9 | 100% | 50% |
| Preform #10 | 100% | 20% |

TABLE B4

OxyClear Content (wt. %)

| | Middle Layer (60) | | | Overall Preform | | |
|---|---|---|---|---|---|---|
| | Low | Mid | High | Low | Mid | High |
| Preform #7 | 1.0% | 2.5% | 6.0% | 0.5% | 1.3% | 3.0% |
| Preform #8 | 2.5% | 6.3% | 15.0% | 0.5% | 1.3% | 3.0% |
| Preform #8 | 1.5% | 2.5% | 6.0% | 0.75% | 1.75% | 3.0% |
| Preform #9 | 0.9% | 2.2% | 3.8% | 0.75% | 1.75% | 3.0% |

The present disclosure provides numerous advantages. For example, concentrating the active oxygen scavenger layer 50 as a thin, high concentration, middle layer provides improved barrier performance as compared to a thick middle layer or monolayer blend. Positioning the active oxygen scavenger layer 50 closer to the inside (core biased) of the preform 10 improves barrier performance. The oxygen 10 barrier 50 is kept out of the thicker finish 20 and can be utilized better in the sidewall 30 of the preform 10, and the sidewall 140 of the container 110 to enhance barrier performance. The active oxygen scavenger layer 50 is fully encapsulated at the tip/dome 40 of the preform 10 to improve performance of the active oxygen scavenger layer 50. Optionally, the active oxygen scavenger layer 50 is not present at the tip/dome 40 of the preform 10 (see FIG. 4B).

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A preform configured to be blow-molded into a container, the preform comprising:
a first layer, the first layer is an active oxygen scavenger layer including an oxygen scavenger, a catalyst, and a first material having up to 25% recycled polymer; and
a second layer including a second material having at least 25% recycled polymer;
wherein the first layer is between two portions of the second layer.

2. The preform of claim 1, wherein the first layer is co-injected from a first melt stream and the second layer is co-injected from a second melt stream.

3. The preform of claim 1, wherein the oxygen scavenger is an oxidizable polymer.

4. The preform of claim 1, wherein the catalyst is a cobalt transition salt.

5. The preform of claim 1, wherein the first layer is about 3% to 20% of an overall weight of the preform.

6. The preform of claim 1, wherein the second layer is about 80% to 97% of an overall weight of the preform.

7. The preform of claim 1, wherein at a tip of the preform the first layer is up to about 20% of an overall thickness of the preform.

8. The preform of claim 1, wherein at a sidewall of the preform the first layer is about 8% to 70% of an overall thickness of the preform.

9. The preform of claim 1, wherein at a tip of the preform the second layer is about 80% to 100% of an overall thickness of the preform.

10. The preform of claim 1, wherein at a sidewall of the preform the second layer is about 30% to 90% of an overall thickness of the preform.

11. The preform of claim 1, wherein the oxygen scavenger is 2.5%-15.0% of a total weight of the first layer; and
wherein the oxygen scavenger is 0.5%-3.0% of the total weight of the preform.

12. A container made of a polymeric material, the container comprising:
a finish defining an opening;
a sidewall of a body;
a base;
a first layer of the sidewall and the base, the first layer is an active oxygen scavenger layer including an oxygen scavenger, a catalyst, and a first material having up to 25% recycled polymer; and
a second layer of the sidewall and the base, the second layer including a second material having at least 25% recycled polymer;
wherein the first layer is between two portions of the second layer.

13. The container of claim 12, wherein the finish includes only one of the first layer and the second layer.

14. The container of claim 12, wherein the oxygen scavenger is an oxidizable polymer.

15. The container of claim 12, wherein the catalyst is a cobalt transition salt.

16. The container of claim 12, wherein:
the first layer is about 3% to 20% of an overall weight of the container; and
the second layer is about 80% to 97% of an overall weight of the container.

17. A preform configured to be blow-molded into a container, the preform comprising:
a first layer, the first layer is an active oxygen scavenger layer including an oxygen scavenger, a catalyst, and a first material having up to 25% recycled polymer; and
a second layer including a second material having at least 25% recycled polymer;

wherein the second layer is between two portions of the first layer.

18. A container made of a polymeric material, the container comprising:
- a finish defining an opening;
- a sidewall of a body;
- a base;
- a first layer of the sidewall and the base, the first layer is an active oxygen scavenger layer including an oxygen scavenger, a catalyst, and a first material having up to 25% recycled polymer; and
- a second layer of the sidewall and the base, the second layer including a second material having at least 25% recycled polymer;
- wherein the second layer is between two portions of the first layer.

* * * * *